United States Patent
Widodo et al.

(10) Patent No.: US 7,966,128 B2
(45) Date of Patent: Jun. 21, 2011

(54) OBSERVED-OBJECT DETECTION APPARATUS AND OBSERVED-OBJECT DETECTION METHOD

(75) Inventors: Ari Widodo, Tokyo (JP); Akira Yoshizawa, Tokyo (JP); Yasutaka Yamauchi, Tokyo (JP); Takeshi Matsui, Tokyo (JP)

(73) Assignee: Denso IT Laboratory, Inc., Tokyo (JP)

( * ) Notice: Subject to any disclaimer, the term of this patent is extended or adjusted under 35 U.S.C. 154(b) by 838 days.

(21) Appl. No.: 11/902,785

(22) Filed: Sep. 25, 2007

(65) Prior Publication Data

US 2008/0077321 A1     Mar. 27, 2008

(30) Foreign Application Priority Data

Sep. 27, 2006   (JP) ................................. 2006-262115

(51) Int. Cl.
*G05D 1/02*   (2006.01)
*G06F 17/10*   (2006.01)
*G06G 7/78*   (2006.01)

(52) U.S. Cl. ... 701/300; 701/208; 701/301; 340/995.24; 356/29

(58) Field of Classification Search .................. 701/200, 701/207, 208, 213, 220, 223, 300, 301; 340/990, 340/995.1–995.28; 342/46, 47, 66; 356/29; 348/77

See application file for complete search history.

(56) References Cited

U.S. PATENT DOCUMENTS 5,414,439 A  *  5/1995  Groves et al. ..................... 345/7
(Continued)

FOREIGN PATENT DOCUMENTS

JP         2005-24313 A      1/2005
(Continued)

OTHER PUBLICATIONS

English Translation of JP 2006146429A.*
(Continued)

*Primary Examiner* — Jack Keith
*Assistant Examiner* — Rami Khatib
(74) *Attorney, Agent, or Firm* — Birch, Stewart, Kolasch & Birch, LLP

(57) ABSTRACT

An information provision apparatus (1) comprises an observed-object detection apparatus (11) and an information output unit (41), and outputs from the information output unit (41) information on an observed object detected by the observed-object detection apparatus (11). The observed-object detection apparatus (11) comprises: a line-of-sight detector (21) for detecting a line of sight of a driver; an object detector (22) for detecting an object which is on a line of sight of a driver, based on the direction of the line of sight detected by the line-of-sight detector (21), on a current position of a vehicle, and on map information; and an observed-object calculator (23) for determining from objects detected by the object detector (22) an observed object observed by a driver, based on time for which the object is on a line of sight. This allows an object observed by a driver to be detected even if there is no trigger from the driver.

9 Claims, 10 Drawing Sheets

U.S. PATENT DOCUMENTS

| | | | |
|---|---|---|---|
| 6,061,068 A * | 5/2000 | Hoffman et al. | 345/619 |
| 6,496,117 B2 * | 12/2002 | Gutta et al. | 340/576 |
| 6,989,754 B2 * | 1/2006 | Kisacanin et al. | 340/576 |
| 7,710,246 B2 * | 5/2010 | Arakawa et al. | 340/435 |
| 2004/0150514 A1 * | 8/2004 | Newman et al. | 340/435 |
| 2004/0178894 A1 * | 9/2004 | Janssen | 340/435 |
| 2005/0073136 A1 * | 4/2005 | Larsson et al. | 280/735 |
| 2006/0267747 A1 * | 11/2006 | Kondo | 340/435 |
| 2008/0195315 A1 * | 8/2008 | Hu et al. | 701/212 |
| 2009/0237644 A1 * | 9/2009 | Uechi | 356/29 |

FOREIGN PATENT DOCUMENTS

| | | | |
|---|---|---|---|
| JP | 2005284975 A | * | 10/2005 |
| JP | 2006146429 A | * | 6/2006 |
| JP | 2006263334 A | * | 10/2006 |
| JP | 2007263931 A | * | 10/2007 |

OTHER PUBLICATIONS

English Translation of JP 2005284975A.*

* cited by examiner

| ATTRIBUTE INFORMATION ON OBSERVED OBJECTS | NUMBER OF PAST OBSERVATIONS |
|---|---|
| HISTORIC BUILDING | 7 |
| AMUSEMENT FACILITY | 3 |
| PARK | 3 |
| ... | ... |

FIG. 3

OBSERVED-OBJECT DETECTION APPARATUS AND OBSERVED-OBJECT DETECTION METHOD

RELATED APPLICATIONS

This application claims the benefit of Japanese Patent Application No. 2006-262115 filed on Sep. 27, 2006 in Japan, the contents of which are incorporated herein by reference.

TECHNICAL FIELD

The present invention relates to an observed-object detection apparatus for recognizing an object being observed by a driver, based on a line of sight of the driver.

BACKGROUND ART

Conventionally, there has been known an in-vehicle navigation apparatus which assists driving by detecting the direction of a line of sight of a driver to recognize an object (a building or the like) seen by the driver, and by providing information on the object or by performing other processes.

Japanese Patent Laid-Open Application No. 2005-24313 describes an in-vehicle navigation apparatus which, even if it has misidentified an object being observed, can easily correct the observed object. The in-vehicle navigation apparatus described in this publication recognizes a voice uttered by a user, such as "What is that?" "What is that building?" and the like. The navigation apparatus, based on the direction of a line of sight of a driver at the time of uttering a voice, determines an object that the driver was looking at.

DISCLOSURE OF THE INVENTION

Problems to be Solved by the Invention

The in-vehicle apparatus of Japanese Patent Laid-Open Application No. 2005-24313 would require a voice trigger from a driver in order to recognize an object that the driver is looking at. A driver would have to consciously specify an object on which the driver wants to be provided with information.

A purpose of the invention made in view of the above-mentioned background is to provide an observed-object detection apparatus capable of detecting an object being observed by a driver even if there is no trigger from the driver.

Means for Solving the Problems

An observed-object detection apparatus of the invention comprises: a map information storage storing map information; a vehicle position detector for detecting a current position and orientation of a vehicle; a line-of-sight detector for detecting a line of sight of a driver; an object detector for detecting an object which is on a line of sight detected by the line-of-sight detector, based on a current position and orientation of a vehicle detected by the vehicle position detector and on map information stored in the map information storage; and an observed-object calculator for determining from objects detected by the object detector an observed object observed by a driver, based on time for which the object is on a line of sight.

There are other aspects of the invention as described below. This disclosure of the invention therefore intends to provide part of aspects of the invention and does not intend to limit the scope of the invention described and claimed herein.

BRIEF DESCRIPTION OF THE DRAWINGS

FIG. 3 shows an example of data stored in a driver information DB;

BEST MODE OF EMBODYING THE INVENTION

Figure 1:
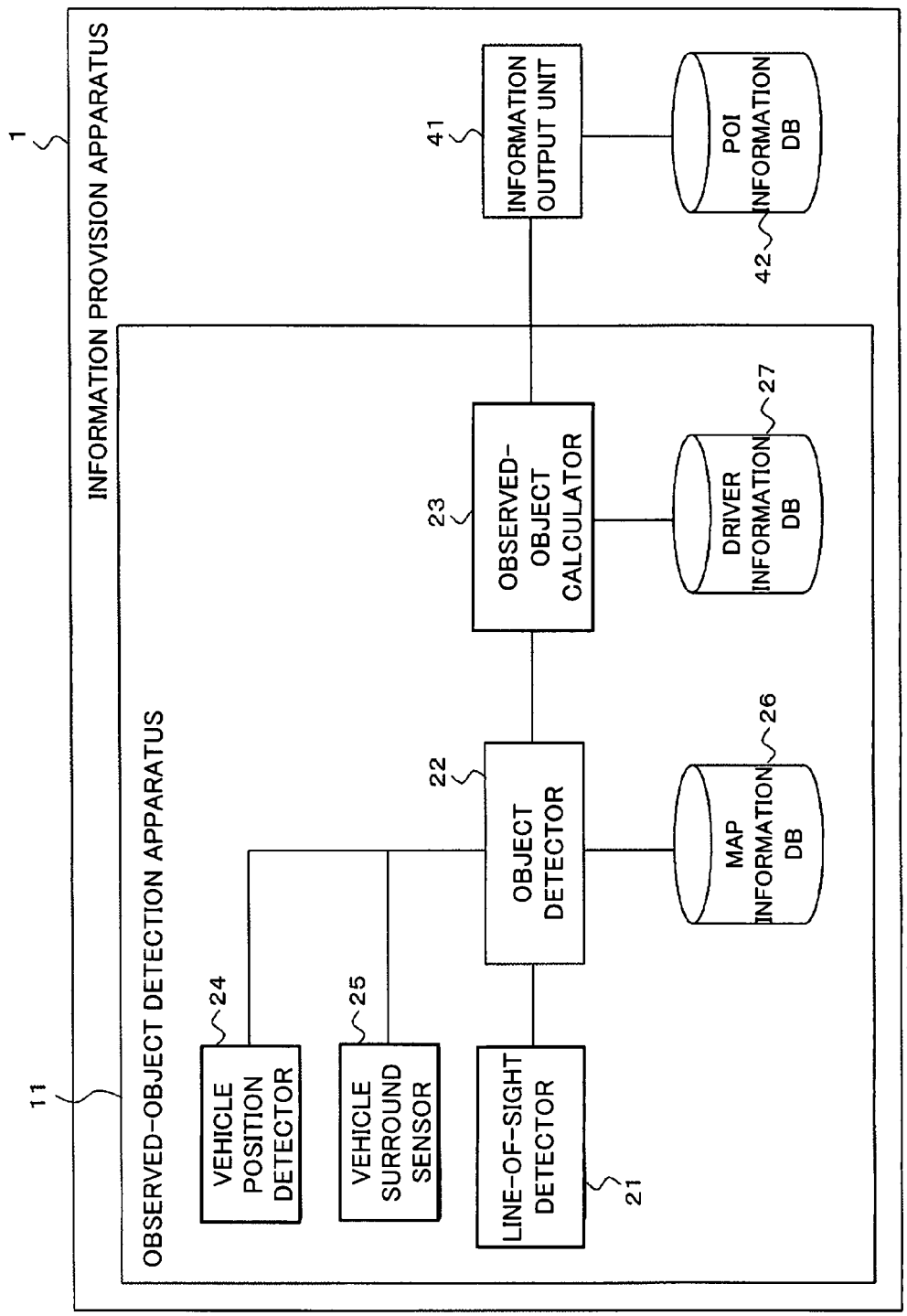
FIG. 1 shows a configuration of an information provision apparatus of a first embodiment.

The following is a detailed description of the invention. It will be understood that the embodiments described below are only examples of the invention, and the invention can be varied in various aspects. Therefore, the specific configurations and functions disclosed below do not limit the claims.

An observed-object detection apparatus of this embodiment comprises: a map information storage storing map information; a vehicle position detector for detecting a current position and orientation of a vehicle; a line-of-sight detector for detecting a line of sight of a driver; an object detector for detecting an object which is on a line of sight detected by the line-of-sight detector, based on a current position and orientation of a vehicle detected by the vehicle position detector and on map information stored in the map information storage; and an observed-object calculator for determining from objects detected by the object detector an observed object observed by a driver, based on time for which the object is on a line of sight.

In this way, from a plurality of objects detected on lines of sight of a driver, an observed object observed by the driver is determined based on time for which the object is on a line of sight, so an observed object can be detected even if there is no trigger from the driver. An object unconsciously observed by a driver can thus be detected as an observed object. If an object has been seen a plurality of times, the time for which the object is on a line of sight may be the total of each time for which the object was seen. Since a driver is basically required to look forward while driving a vehicle, when a driver looks at an object in which the driver is interested, the driver often looks at the object a plurality of times. In this case, each time for which the object was seen is added up, and an observed object can be detected based on the total time.

In the above-described observed-object detection apparatus, the observed-object calculator may assign a weight to time for which the object is on a line of sight to determine an evaluation value, and determine as an observed object an object whose evaluation value is equal to or greater than a prescribed threshold.

Time for which an object is on a line of sight is thus assigned with a weight, and an object observed can be determined properly. For example, an object observed with interest by a driver can be determined by assigning weight according to the driver's interest.

The above-described observed-object detection apparatus may comprise: a driver information storage storing an attribute of an object observed in a past by a driver, where the observed-object calculator, based on an attribute of an object stored in the driver information storage and on an attribute of a detected object, may assign a weight to time for which the object is on a line of sight to determine the evaluation value.

An evaluation value can thus be determined by, based on an attribute of an object observed in a past by a driver and on an attribute of a detected object, assigning a weight to time for which the object is on a line of sight, and the observed object can therefore be determined in accordance with driver's preferences. For example, increasing the weight for an object having the same attribute as that of an object observed in a past allows an object having the same attribute as an object observed in a past by a driver to be appropriately detected as an observed object. Conversely, decreasing the weight for an attribute of an object never observed in a past can prevent an object having an attribute which a driver has never been interested in from being detected as an observed object.

The above-described observed-object detection apparatus may comprise: a vehicle state detector for detecting a state of a vehicle, where the observed-object calculator may vary the weight based on a state of a vehicle detected by the vehicle state detector.

The frequency of a look-around action of a driver varies depending on the state of a vehicle. For example, when a vehicle is stopped, a driver looks around more frequently than when it is traveling. So, if an observed object, when a vehicle is stopped, is to be detected with the same criterion as that for when it is traveling, an object in which a driver is less interested than when the vehicle is traveling will be detected as an observed object. Since a driver tends to look around for safety during a right or left turn and during a lane change, an object in which a driver is less interested than when the vehicle is normally traveling will be detected as an observed object. In an embodiment, the weight is varied depending on the vehicle state in such a way that, for example, the weight is reduced during a stop, during a right or left turn, or during a lane change, and the criterion for detecting an observed object can therefore be adjusted to the same level irrespective of the vehicle state. The vehicle state is not limited to the above-illustrated states of traveling, being stopped, turning right or left, and changing a lane. Other various vehicle states can be detected and the weight can be varied depending on the vehicle state.

The above-described observed-object detection apparatus may comprise: a route information storage for storing set route information, where the observed-object calculator may lower the weight to determine the evaluation value in a case where a distance to a destination, based on route information stored in the route information storage and on a current position of a vehicle, is detected to be equal to or less than a prescribed threshold, as compared to a case where a distance to a destination is greater than a prescribed threshold.

Near a destination of a set route, a driver usually looks around in order to find the destination. So, if an observed object is to be detected near a destination with the same criterion as that for when a vehicle is far from the destination, an object in which a driver is less interested than when the vehicle is far from the destination will be detected as an observed object. In an embodiment, the weight is set low when a vehicle is near a destination, and therefore the criteria for detecting an observed object for when a vehicle is near a destination and for when it is far from a destination can be adjusted to the same level.

The above-described observed-object detection apparatus may comprise: a travel history storage storing information indicating a past travel route of a vehicle, where the observed-object calculator may judge whether a current position of a vehicle accords with a past travel route stored in the travel history storage or not, and vary the weight based on a result of the judgment to determine the evaluation value.

On a route which a driver traveled on in a past, the driver has a grasp of what objects there are on the route, and therefore the driver's observation action is different from when the driver is on a route which the driver travels on for the first time. For this reason, an observed object can be appropriately detected by varying the weight depending on whether the route has been traveled on in a past or not.

The above-described observed-object detection apparatus may comprise: a microphone for collecting a sound of a conversation in a vehicle, and a conversation analyzer for analyzing a conversation whose sound is collected by the microphone, where the observed-object calculator may determine a degree of interest in an object based on an analysis result by the conversation analyzer, and vary the weight based on the degree of interest.

Varying the weight based on a degree of interest in an object obtained from a conversation analysis result in this way allows an observed object to be appropriately detected.

An information provision apparatus of an embodiment comprises: the above-described observed-object detection apparatus; and an output unit for outputting information on an observed object detected by the observed-object detection apparatus.

This allows an observed object to be detected even if there is no trigger from a driver, and allows information on an observed object to be provided.

A driving scene shooting apparatus of an embodiment comprises: the above-described observed-object detection apparatus; and an outside-vehicle camera for shooting an object outside a vehicle, where the outside-vehicle camera shoots an observed object detected by the observed-object detection apparatus.

This allows an observed object to be detected even if there is no trigger from a driver, and allows the observed object to be shot.

An observed-object detection method of an embodiment comprises steps of: detecting a current position and orientation of a vehicle; detecting a line of sight of a driver; detecting an object which is on a line of sight of a driver, based on a current position and orientation of a vehicle and on map information stored in a map information storage; and determining from detected objects an observed object observed by a driver, based on time for which the object is on a line of sight.

This allows an observed object to be detected even if there is no trigger from a driver, and allows an object unconsciously observed by a driver to be detected as an observed object, as in the case of the observed-object detection apparatus of the embodiment. The various configurations of the observed-object detection apparatus of the embodiment can be applied to the observed-object detection method of the embodiment.

A program of an embodiment for detecting an observed object from a line of sight of a driver makes a computer execute steps, the computer comprising: a vehicle position detector for detecting a current position and orientation of a vehicle; and a line-of-sight detector for detecting a line of sight of a driver, the steps comprising: detecting a current position and orientation of a vehicle; detecting a line of sight of a driver; detecting an object which is on a line of sight of a driver, based on a current position and orientation of a vehicle and on map information; and determining from detected objects an observed object observed by a driver, based on time for which the object is on a line of sight.

This allows an observed object to be detected even if there is no trigger from a driver, and allows an object unconsciously observed by a driver to be detected as an observed object, as in the case of the observed-object detection apparatus of the embodiment. The various configurations of the observed-object detection apparatus of the embodiment can be applied to the program of the embodiment.

Now, information provision apparatuses of embodiments of the invention will be described with reference to the drawings.

First Embodiment

FIG. 1 shows a configuration of an information provision apparatus 1 of a first embodiment. The information provision apparatus 1 is incorporated in an in-vehicle car navigation apparatus, and provides information on an object observed by a driver.

The information provision apparatus 1 has an observed-object detection apparatus 11 for detecting an object observed by a driver, and an information output unit 41 for outputting information on an observed object detected by the observed-object detection apparatus 11. The information output unit 41 outputs information on an observed object by means of an audio output or display output.

The information output unit 41 is connected with a POI information database (hereinafter referred to as the "POI information DB") 42. The POI information DB 42 stores information on objects. Information acquired from a website may be processed and stored in the POI information DB 42. The information output unit 41 reads from the POI information DB 42 information on an observed object detected by the observed-object detection apparatus 11, and outputs the read information.

The observed-object detection apparatus 11 will be described next. The observed-object detection apparatus 11 comprises: a line-of-sight detector 21 for detecting a line of sight of a driver; an object detector 22 for detecting an object which is on a line of sight of a driver detected by the line-of-sight detector 21; and an observed-object calculator 23 for determining from objects detected by the object detector 22 an observed object observed by a driver.

The line-of-sight detector 21 comprises: an inside-vehicle camera for shooting a driver; and an image processor for processing an image shot by the inside-vehicle camera. The line-of-sight detector 21 detects from an image shot by the inside-vehicle camera the orientation of a driver's face and the direction of eyes, detects a vehicle-based line of sight of the driver, and inputs information on the detected line of sight into the object detector 22. While in the embodiment a line of sight is to be determined using the orientation of a face and the direction of eyes, a line of sight may be approximated using only the orientation of a face in order to ease the calculation process.

The object detector 22 is connected with a vehicle position detector 24, a vehicle surround sensor 25, and a map information database (hereinafter referred to as the "map information DB") 26. The vehicle position detector 24 has a function to detect a current position of a vehicle and the orientation of the vehicle (the direction of movement). The vehicle position detector 24, for example, comprises a GPS, a vehicle speed sensor, a gyroscope, and the like. The vehicle surround sensor 25 has a function to detect the course, an obstruction in front, and other surroundings of a vehicle. The vehicle surround sensor 25 also has a function to identify detected various objects by means of image processing and detect a pedestrian, a signal, a road sign, or the like. The map information DB 26 stores map information. As well as road information, a name of a building and attribute information indicating what kind of building it is are included in the map information, being associated with position information (latitude and longitude).

The object detector 22 detects an object which is on a line of sight, using information on a line of sight inputted from the line-of-sight detector 21, information detected by the vehicle position detector 24 and the vehicle surround sensor 25, and the map information stored in the map information DB 26.

Specifically, the object detector 22 initially converts the direction of a vehicle-based line of sight inputted from the line-of-sight detector 21 to the direction of an earth-based line of sight, using information on the orientation of the vehicle detected by the vehicle position detector 24. That is, the direction of a line of sight represented by an in-vehicle coordinate axis, which is a local standard different from vehicle to vehicle, is represented with respect to an absolute coordinate axis.

The object detector 22 then searches the map information DB 26 for the object which is on the line of sight. Based on the position of a pedestrian, a signal, a road sign, or the like detected by the vehicle surround sensor 25, the object detector 22 detects as an object a pedestrian, a signal, a road sign, or the like which is on the line of sight. A signal, a road sign, or the like may be retrieved from the map information DB 26.

Figure 2:
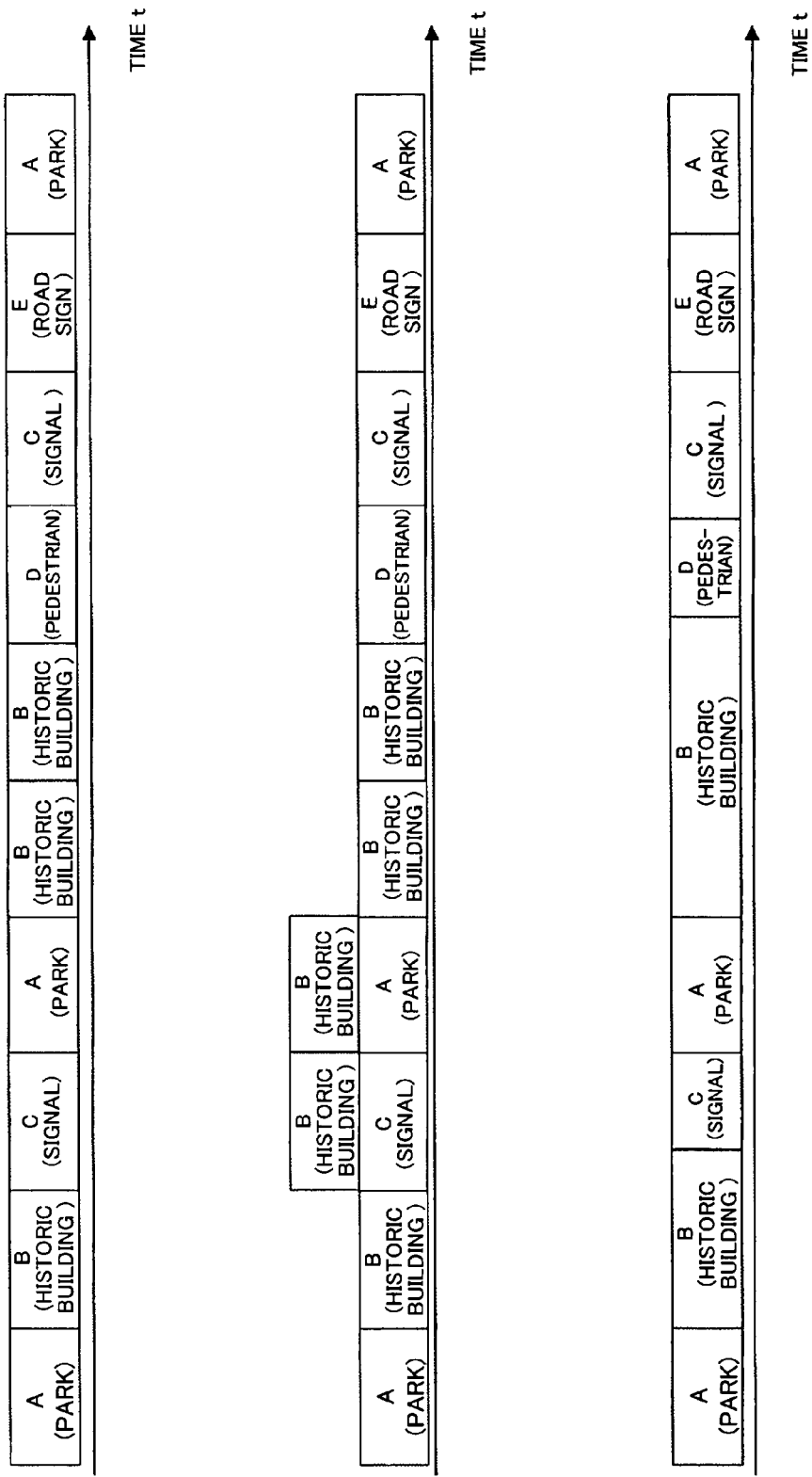
FIG. 2A shows an example of data on an object detected by an object detector.
FIG. 2B shows another example of data on an object detected by an object detector.
FIG. 2C shows another example of data on an object detected by an object detector.

FIGS. 2A to 2C show examples of data on objects detected by the object detector 22. As shown in FIG. 2A, the object detector 22 detects every unit time an object which is on a line of sight of a driver. In the example shown in FIG. 2A, a line of sight of a driver is moving from an object A to an object B to an object C to the object A, and so on. When there are two or more objects on a line of sight of a driver, the closest object may be detected, or two or more objects may be detected as shown in FIG. 2B. In FIGS. 2A and 2B, an object which is on a line of sight is detected with a prescribed time being the unit. Alternatively, as shown in FIG. 2C, an object may be detected right after an object which is on a line of sight changes. Also by the method in which an object is detected every prescribed time (referred to as a "unit time" in the specification), a case can be prevented where an object on a line of sight changes during a unit time, as long as the unit time is a very short time. Since the shortest time for which a human being looks for a thing is about 0.1 seconds when the human being is familiar with the environment, an object seen by a human being can be detected if the unit time is 0.1 seconds.

The observed-object calculator 23 has a function to determine an observed object observed by a driver, from objects detected by the object detector 22. The observed-object calculator 23 adds up unit times for which each object was detected to determine as an evaluation value the time for which an object was on a line of sight, and judges that the object is an observed object if the evaluation value is equal to or greater than a prescribed threshold. When adding up unit times for which an object was detected, the observed-object calculator 23 reads from a driver information database (hereinafter referred to as the "driver information DB") 27 information on objects observed in a past by the driver and, using the read information, assigns a weight to unit times for which the object was detected.

FIG. 3 shows an example of data stored in the driver information DB 27 which is connected to the observed-object calculator 23. The driver information DB 27 stores "Attribute information on observed objects" which indicates attributes of objects observed in a past by a driver, and information on the "Number of past observations" which indicates the number of times for which objects having the attribute were observed.

In the embodiment, the observed-object calculator 23 uses as a weighting coefficient the number of past observations corresponding to an attribute of an object detected by the object detector 22. Accordingly, the weighting coefficient gets larger for an object having an attribute with a larger number of past observations, and therefore an object in which a driver is likely to be interested can be determined as an observed object. The observed-object calculator 23 thus assigns a weight using information stored in the driver information DB 27, so an observed object can be determined in accordance with driver's preferences.

Figure 4:
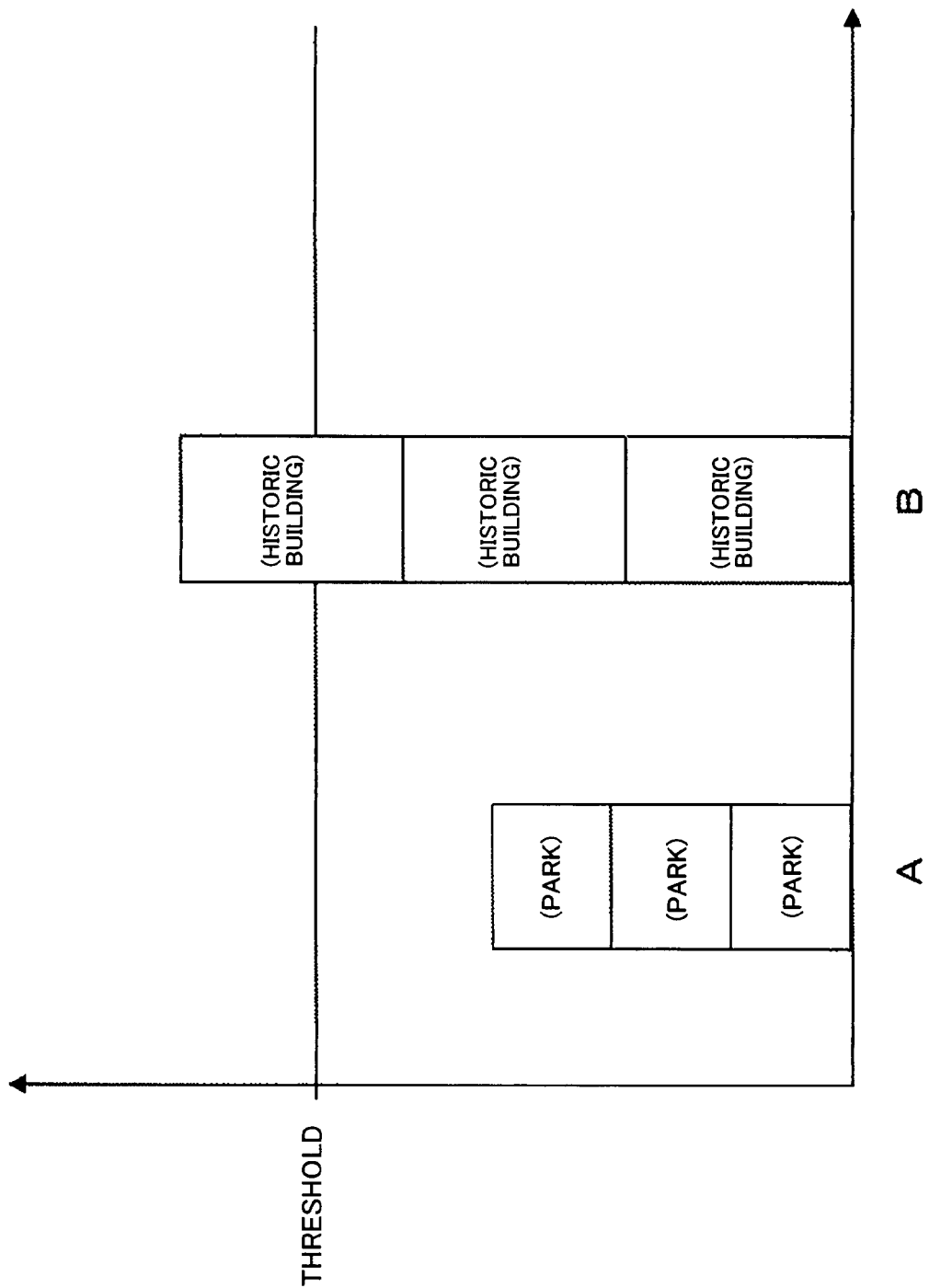
FIG. 4 shows an evaluation value calculated by an observed-object calculator.

FIG. 4 shows evaluation values calculated by the observed-object calculator 23. FIG. 4 illustrates a case where objects shown in FIG. 2A are detected. In the example shown in FIG. 2A, the object A (park) and the object B (historic building) are detected three times each, the object C (signal) is detected twice, and the object D (pedestrian) and the object E (road sign) are detected once each. As shown in FIG. 4, the observed-object calculator 23 multiplies the object A, which is a park, by a weighting coefficient of "3" and sums them up, multiplies the object B, which is a historic building, by a weighting coefficient of "7" and sums them up, to determine evaluation values. As a result, the evaluation value of the object B equals or exceeds a threshold, and the observed-object calculator 23 therefore determines the object B as an observed object.

In the example of FIG. 2A, the object C (signal), the object D (pedestrian), and the object E (road sign) are also detected as an object which is on a line of sight. However, since a signal, a pedestrian, and a road sign ought to be observed because of the requirement for driving, they are not objects to be provided with information by the information provision apparatus 1 of the embodiment. So, in the embodiment, an evaluation value is not calculated for a signal, a pedestrian, and a road sign. For a signal, a pedestrian, and a road sign, an evaluation value may be calculated with the weighting coefficient being set small, instead of not calculating an evaluation value at all. This allows a signal and a pedestrian to be candidates for an observed object.

When having determined an observed object, the observed-object calculator 23 updates the number of past observations in the driver information DB 27 according to an attribute of the determined observed object. This allows the driver information DB 27 to learn to suit driver's preferences. As the number of past observations increases for a specific attribute in the driver information DB 27, the weighting coefficient for the specific attribute gets larger, and an object becomes easy to be detected as an observed object. As a result, a cycle occurs in which an object with the specific attribute is detected and the number of past observations in the driver information DB 27 is incremented, and a phenomenon occurs in which the number of observations becomes significantly large for the specific attribute. This may make an object with the specific attribute to be detected as an observed object even when a driver has not observed it. In order to prevent this kind of situation, the weighting coefficient may be fixed to a certain value irrespective of the number of observations when the number of past observations exceeds a prescribed number.

Initial values of data to be stored in the driver information DB 27 may be the following: (1) the number of observations is not set and all weights are set to one; or (2) the number of observations is set according to the preferences of average people.

Figure 5:
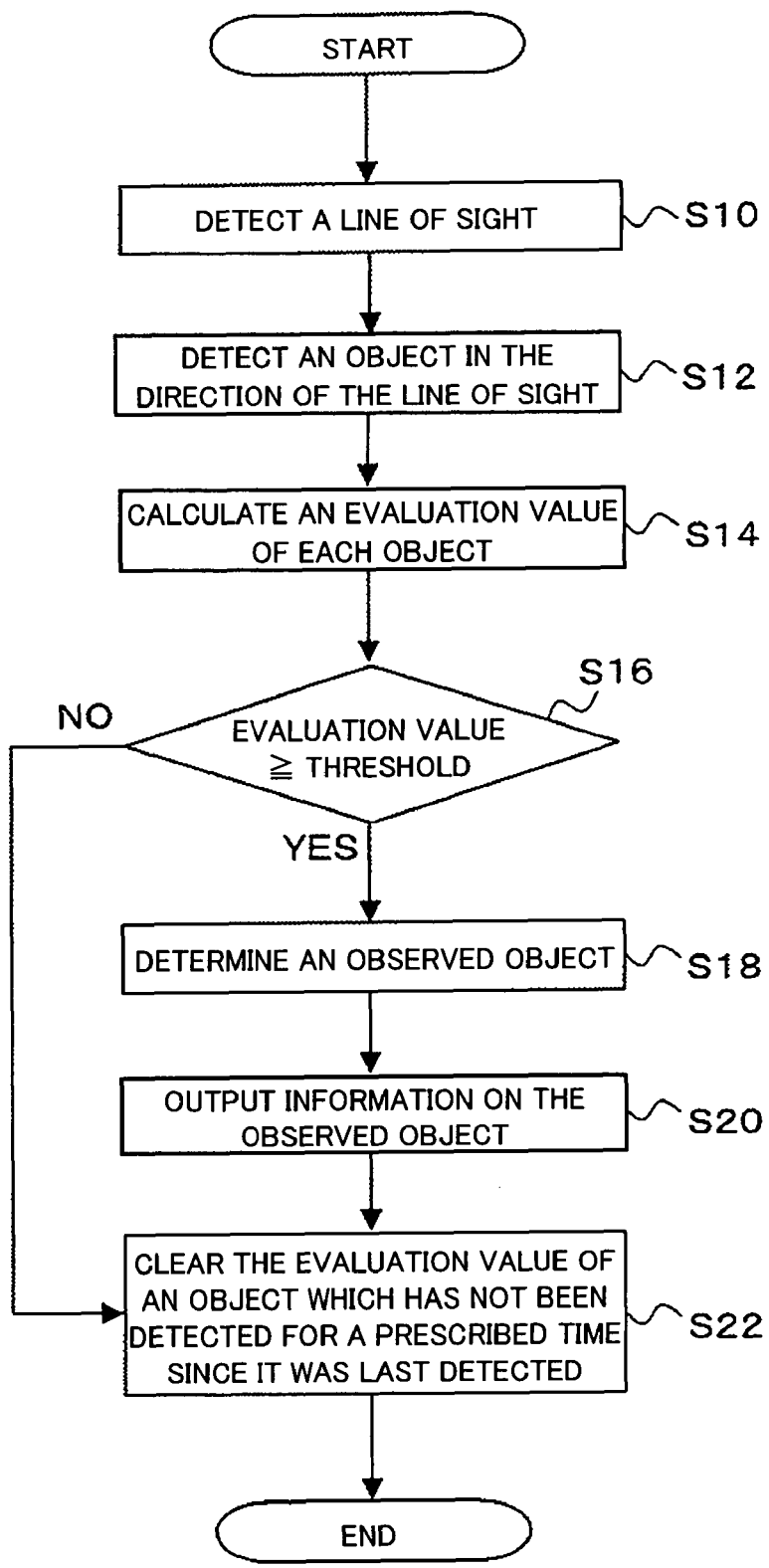
FIG. 5 shows an operation of the information provision apparatus of the first embodiment.

FIG. 5 shows an operation of the information provision apparatus 1 of the embodiment. The information provision apparatus 1 detects a line of sight of a driver by means of the line-of-sight detector 21, and inputs the direction of the detected line of sight to the object detector 22 (S10). Based on the inputted direction of the vehicle-based line of sight and on the orientation of the vehicle, the object detector 22 determines the direction of an earth-based line of sight, and it detects an object which is on the line of sight (S12). The object detector 22 inputs information on the detected object to the observed-object calculator 23.

The observed-object calculator 23 calculates an evaluation value of the detected object (S14). Based on the number of past observations stored in the driver information DB 27, the observed-object calculator 23 determines a weighing coefficient corresponding to an attribute of the object, and it multiplies time for which the object was on the line of sight by the determined weighting coefficient to calculate the evaluation value. Specifically, the observed-object calculator 23 stores evaluation values in the calculation for every object inputted from the object detector 22. In the example shown in FIG. 4, there are set a variable for temporarily storing the evaluation value of the object A, and a variable for temporarily storing the evaluation value of the object B. When data on a detected object is inputted from the object detector 22, the observed-object calculator 23 increments the variable for the evaluation value of the object by a value calculated by multiplying unit times for which the object was detected by the weighting coefficient. The observed-object calculator 23 judges the object to be an observed object when the evaluation value becomes equal to or greater than a prescribed threshold.

The observed-object calculator 23 then judges for each object whether the evaluation value in the calculation is equal to or greater than a prescribed threshold or not (S16). If the judgment result is that the evaluation value is equal to or greater than the prescribed threshold (YES in S16), the observed-object calculator 23 determines the object as an observed object (S18) and notifies the information output unit 41 of information on the determined observed object.

The information output unit 41 reads from the POI information DB 42 POI information on the observed object determined by the observed-object calculator 23, and outputs the read POI information (S20).

The observed-object calculator 23 checks whether there is, among each object whose evaluation value is being calculated, an object which has not been detected for a prescribed time since it was last detected or not, and clears the evaluation value of an object which has not been detected for the prescribed time since it was last detected (S22). For example, in the example shown in FIG. 4, if the object A has not been detected for a prescribed time (e.g. two minutes) since it was detected for the third time, the observed-object calculator 23 clears the variable which is for incrementing the evaluation value of the object A. A memory area is thus cleared which was allocated to calculate an evaluation value of an object which is deemed to have disappeared from driver's sight because of a movement of a vehicle, and the working memory can be used effectively.

If an evaluation value is judged not to be equal to or greater than the prescribed threshold in the judgment on the evaluation value by the observed-object calculator 23 (NO in S16), there is no observed object, and therefore the process proceeds to a step S22 without outputting any information.

By repeating the operation shown in FIG. 5, the information provision apparatus 1 successively detects objects which are on a line of sight of a driver, determines an observed object from a plurality of detected objects, and provides information on the determined observed object. The above is a description of a configuration and operation of the information provision apparatus 1 of the first embodiment.

Since the information provision apparatus 1 of the embodiment, by means of the observed-object calculator 23, determines an observed object observed by a driver from various objects captured by a line of sight of the driver and outputs information on the determined observed object, the information provision apparatus 1 can provide information on an object observed by a driver even if there is no instruction from the driver.

Since the information provision apparatus 1 of the embodiment determines an observed object using an evaluation value to which a weight is assigned according to the number of observations made in a past by a driver, an observed object can be determined in accordance with driver's preferences. An object having an attribute with a large number of past observations, i.e. an object which suits driver's preferences, can be detected as an observed object even if time for which it is on a line of sight of the driver is relatively short, and therefore a timely information provision can be achieved.

Second Embodiment

Figure 6:
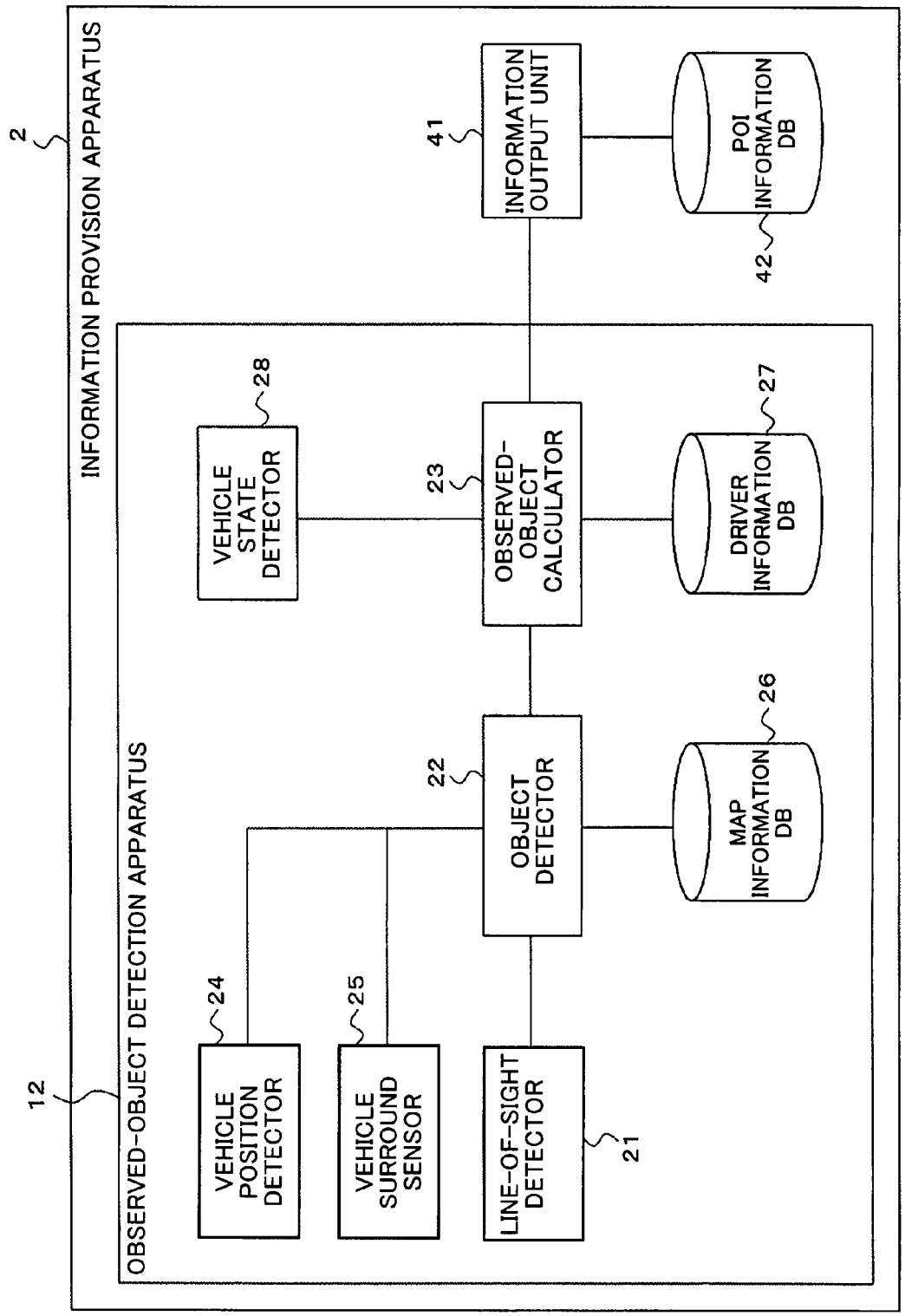
FIG. 6 shows a configuration of an information provision apparatus of a second embodiment.

FIG. 6 shows a configuration of an information provision apparatus 2 of a second embodiment of the invention. The configuration of the information provision apparatus 2 of the second embodiment is basically the same as the information provision apparatus 1 of the first embodiment, but is different in that an observed-object detection apparatus 12 is provided with a vehicle state detector 28.

The vehicle state detector 28 has a function to detect the state of a vehicle indicating whether the vehicle is traveling or stopped. In the embodiment, the observed-object calculator 23 determines an observed object using the state of a vehicle detected by the vehicle state detector 28, as well as using information stored in the driver information DB 27. If the state of a vehicle detected by the vehicle state detector 28 indicates that the vehicle is stopped, the observed-object calculator 23 sets a smaller weighting coefficient compared to when the vehicle is traveling.

An evaluation value is thus calculated low for an object detected when it is stopped, so an object detected when it is stopped is not easily judged to be an observed object compared to an object detected when it is traveling. When a vehicle is stopped, a driver tends to look around compared to when a vehicle is traveling, and therefore an object detected when a vehicle is stopped is not significantly related to driver's interest. In the information provision apparatus 2 of the embodiment, the weighting coefficient is set small when a vehicle is stopped, and thereby the criteria for detecting an observed object for when a vehicle is stopped and for when it is traveling can be adjusted to the same level.

In the embodiment, there has been described an example where the vehicle state detector 28 detects whether a vehicle is stopped or traveling. Alternatively, the vehicle state detector 28 may detect whether a vehicle is turning right or left or changing a lane or not, based on a blinker state detection and steering angle information. Since a driver tends to look around for safety during a right or left turn or during a lane change, the weighting coefficient is set small, and thereby the criteria for detecting an observed object for when a vehicle is turning right or left or changing a lane and for when it is traveling straight can be adjusted to the same level.

Third Embodiment

Figure 7:
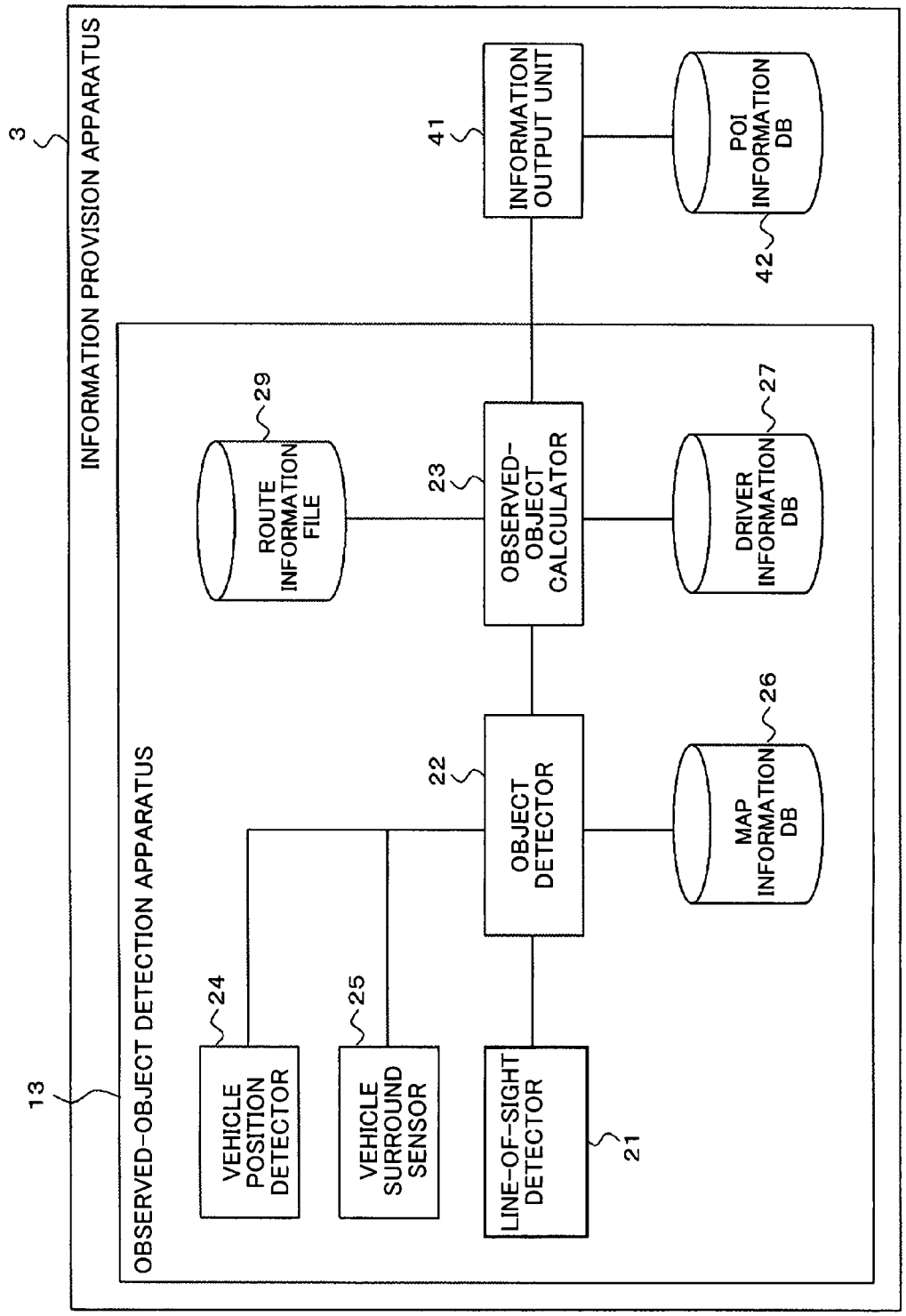
FIG. 7 shows a configuration of an information provision apparatus of a third embodiment.

FIG. 7 shows a configuration of an information provision apparatus 3 of a third embodiment of the invention. The configuration of the information provision apparatus 3 of the third embodiment is basically the same as the information provision apparatus 1 of the first embodiment, but is different in that, in an observed-object detection apparatus 13, the observed-object calculator 23 is connected to a route information file 29.

The observed-object calculator 23 determines an observed object using route information on a vehicle stored in the route information file 29, as well as using information stored in the driver information DB 27. In the embodiment, the observed-object calculator 23 reads information on a destination from the route information file 29, and sets the weighting coefficient using information indicating whether a current position of a vehicle is near the destination or not. Specifically, when the distance between the current position of the vehicle and the destination is equal to or smaller than a prescribed threshold, the weighting coefficient is set smaller compared to when the distance between the current position of the vehicle and the destination is larger than the prescribed threshold.

An evaluation value is thus calculated low when a vehicle is near a destination, so an object is not easily judged to be an observed object compared to when the vehicle is far from the destination. When a vehicle is near a destination, a driver tends to look around in order to find the destination, and therefore an object detected near a destination is not significantly related to driver's interest. In the information provision apparatus 3 of the embodiment, the weighting coefficient is set small when a vehicle is near a destination, and thereby the criteria for detecting an observed object can be adjusted between when a vehicle is near a destination and when it is not.

Fourth Embodiment

Figure 8:
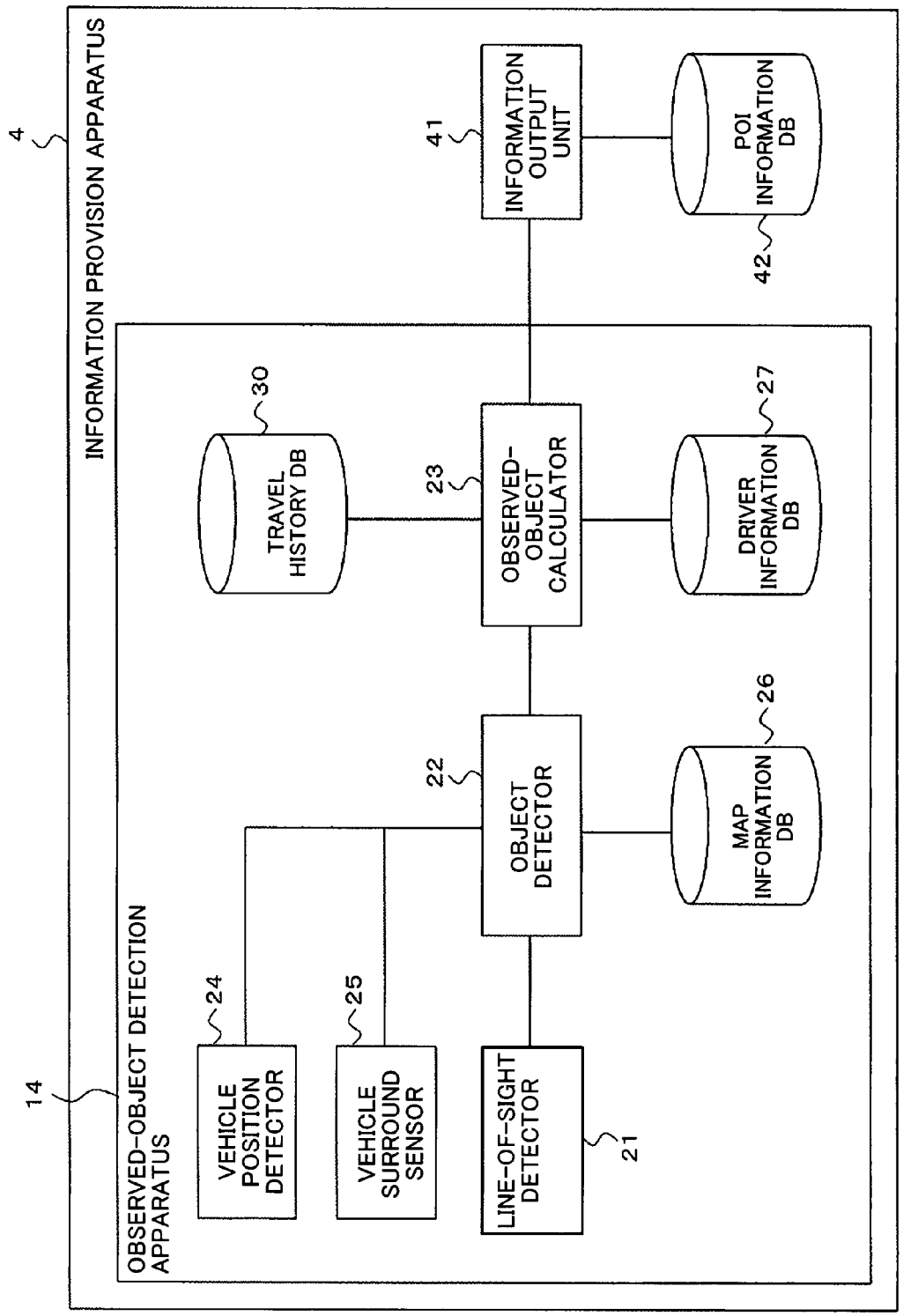
FIG. 8 shows a configuration of an information provision apparatus of a fourth embodiment.

FIG. 8 shows a configuration of an information provision apparatus 4 of a fourth embodiment of the invention. The configuration of the information provision apparatus 4 of the fourth embodiment is basically the same as the information provision apparatus 1 of the first embodiment, but is different in that an observed-object detection apparatus 14 is provided with a travel history database (hereinafter referred to as the "travel history DB") 30.

The observed-object calculator 23 determines an observed object using a travel history of a vehicle stored in the travel history DB 30, as well as using information stored in the driver information DB 27. In the embodiment, the observed-object calculator 23 reads information on a past travel route from the travel history DB 30, and sets the weighting coefficient using information indicating whether a current position of a vehicle is on the past travel route or not. Specifically, when the current position of the vehicle is on the past travel route, the weighting coefficient is set smaller compared to when it is not on the past travel route.

An evaluation value is thus calculated low when a vehicle is on a past travel route, so an object is not easily judged to be an observed object compared to when the vehicle is on a first-time travel route. When a vehicle is traveling on a route on which the vehicle has traveled before, the driver is judged to have a general grasp of objects that can be seen from the travel route, so there is not much need to provide information on objects that can be seen from the route. By judging an observed object using data stored in the travel history DB 30, the information provision apparatus 4 of the embodiment allows a driver not to be provided with information that the driver already knows, and can prevent the driver from being bothered.

In a case where information to be provided by the information provision apparatus 4 is not general explanatory information on an object but instead event information or the like that is to be updated everyday, the weighting coefficient does not have to be lowered even when a vehicle is on a past travel route. For example, there is a case where a familiar building attracts people because of the holding of an event or the like. A driver can be detected to have observed a person who entered a building, and information can be provided on an event being held in the building. In this way, when an observed object is judged using a past travel route, the weighting coefficient can be set as appropriate for information to be provided on the observed object.

Fifth Embodiment

Figure 9:
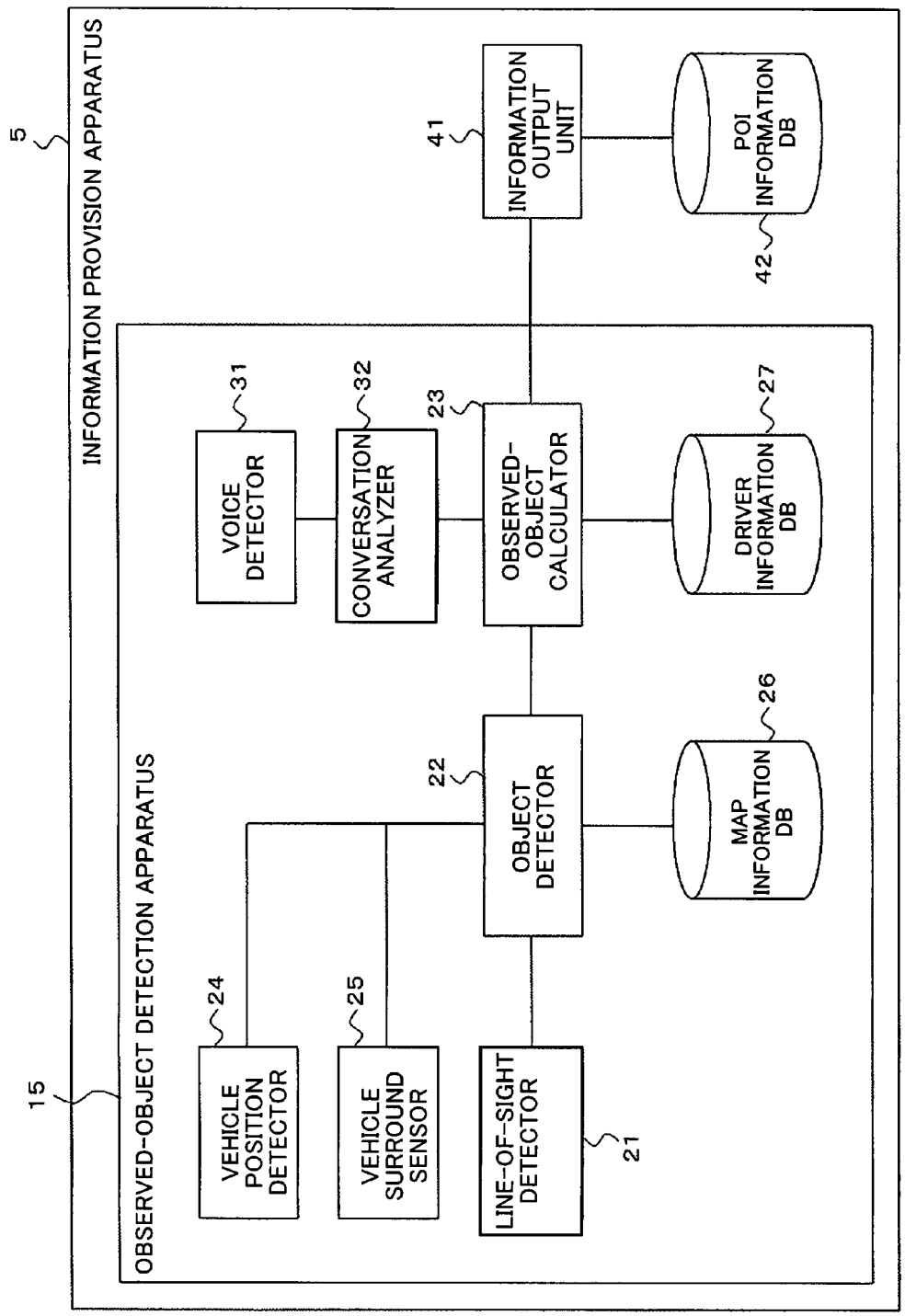
FIG. 9 shows a configuration of an information provision apparatus of a fifth embodiment.

FIG. 9 shows a configuration of an information provision apparatus 5 of a fifth embodiment of the invention. The configuration of the information provision apparatus 5 of the fifth embodiment is basically the same as the information provision apparatus 1 of the first embodiment, but is different in that an observed-object detection apparatus 15 is provided with a voice detector 31 and a conversation analyzer 32.

In the embodiment, the observed-object calculator 23 determines an observed object using the contents of a conversation between a driver and a fellow passenger, as well as using information stored in the driver information DB 27.

The voice detector 31 has a function to detect the voices of a driver and a fellow passenger, and inputs detected voice data to the conversation analyzer 32. The voice detector 31, for example, comprises a microphone. The conversation analyzer 32 performs a natural language analysis on voice data inputted from the voice detector 31, and inputs the analysis result to the observed-object calculator 23.

Using an analysis result inputted from the conversation analyzer 32, the observed-object calculator 23 determines a degree of interest of a driver in a detected object. For example, if an object is detected at the timing when a conversation including a demonstrative pronoun, such as "The building over there is interesting," and "Wow! What is that?" is made, the object is judged to be of a high degree of interest, and the weighting coefficient is set high. Conversely, if a conversation does not include a demonstrative pronoun, the conversation is judged to be made irrespective of the view outside a vehicle, and the weighting coefficient is set low.

In the embodiment, a degree of interest is determined based on a conversation in a vehicle, and the weighting coefficient is determined depending on the degree of interest, so that an observed object can be determined appropriately.

In the embodiment, there has been described an example where a degree of interest in an object is determined based on whether a conversation includes a demonstrative pronoun or not. Alternatively, another method may be adopted for determining a degree of interest. For example, whether a prescribed keyword is included or not may be judged, or the volume of a conversation or the like may be used to determine a degree of interest.

Sixth Embodiment

Figure 10:
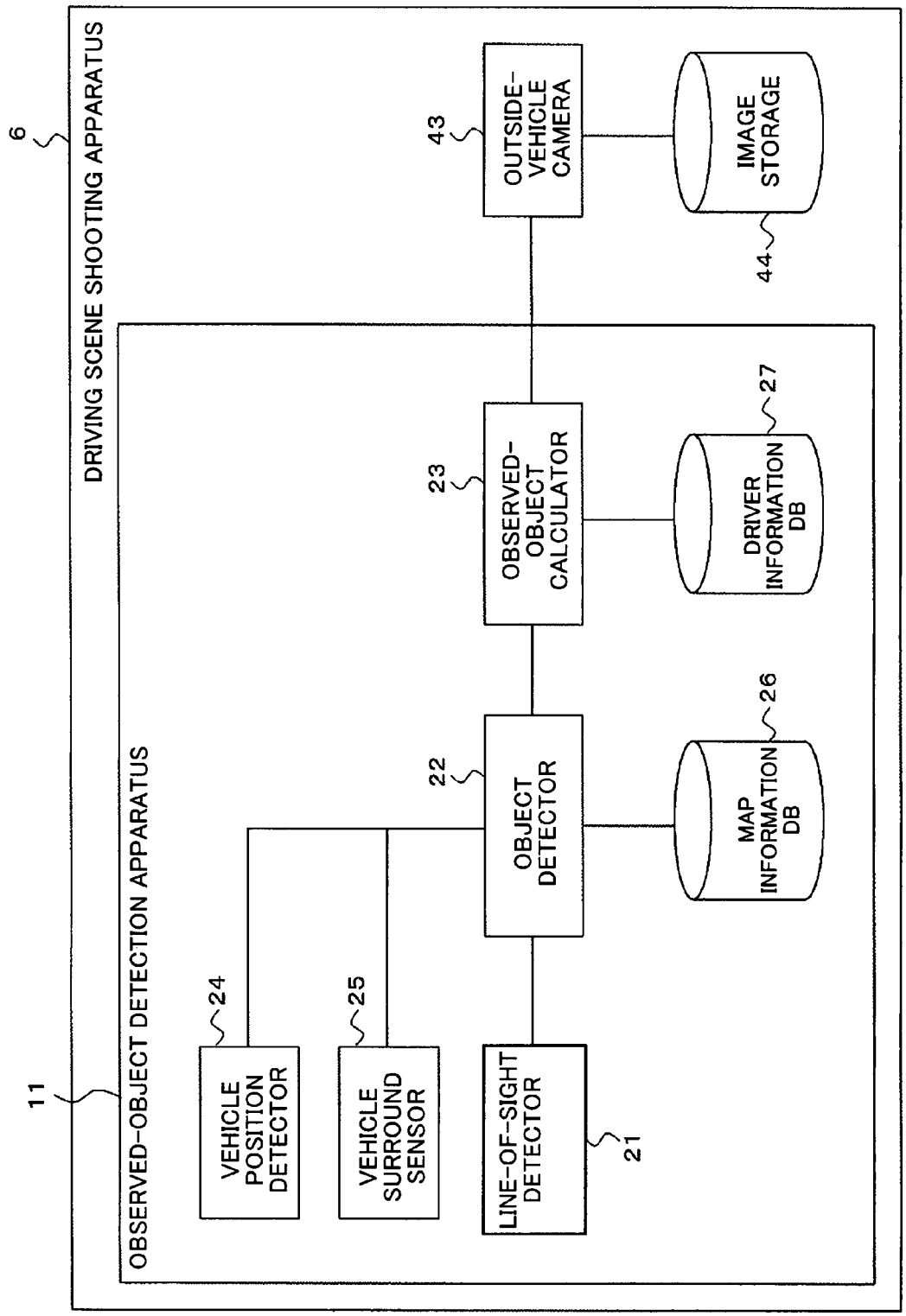
FIG. 10 shows a configuration of a driving scene shooting apparatus of a sixth embodiment.

FIG. 10 shows a configuration of a driving scene shooting apparatus 6 of a sixth embodiment of the invention. The driving scene shooting apparatus 6 of the sixth embodiment is provided with the observed-object detection apparatus 11 described in the first embodiment. In the driving scene shooting apparatus 6, the observed-object detection apparatus 11 is connected with an outside-vehicle camera 43. The driving scene shooting apparatus 6 is also provided with an image storage 44 for storing an image shot by the outside-vehicle camera 43.

The driving scene shooting apparatus 6 inputs to the outside-vehicle camera 43 position information on an observed object determined by the observed-object calculator 23. Based on a current position of a vehicle and on position information on an observed object, the outside-vehicle camera 43 shoots the observed object and stores the shot image in the image storage 44.

The driving scene shooting apparatus 6 of the embodiment determines from various objects captured by a line of sight of a driver an observed object observed by the driver, and outputs information on the determined observed object. The driving scene shooting apparatus 6 can therefore store as a driving scene an object in which a driver is regarded as being interested, even if there is no instruction from the driver.

In the embodiment, there has been described the driving scene shooting apparatus 6 provided with the observed-object detection apparatus 11 described in the first embodiment. Alternatively, any one of the observed-object detection apparatuses 12 to 15 described in the above second to fifth embodiments may be used instead of the observed-object detection apparatus 11.

There have been described with embodiments the observed-object detection apparatus, information provision apparatus, and driving scene shooting apparatus of the invention, but the invention is not limited to the above-described embodiments.

In the above embodiments, there have been described examples in which the setting of the weighting coefficient is changed based on various factors. However, the factors to be used for changing the setting of the weighting coefficient are not limited to those described in the above embodiments.

For example, the weighting coefficient may be set based on an action history of a driver. For example, after a vehicle made a stop at a restaurant, the weight may be lessened for an object whose attribute is a restaurant. This can reduce the bother of being provided with information on a restaurant after a meal. Other objects which can be processed in the same way include a gas station, convenience store, and the like.

A motion of a driver's line of sight on a route on which the driver usually travels, such as on a commute route, may be stored as a history, and when a line of sight moves differently from the history, the weighting coefficient may be set high for an object which is on the line of sight. A driver acts habitually on a route which the driver usually passes, and if the driver takes an action different from the habit, the driver is regarded as being interested in something. Using a history allows an observed object to be determined appropriately.

A pattern of a motion of a driver's line of sight during traveling may be stored, and when a motion different from the pattern is taken, the weighting coefficient may be set high for an object which is on the line of sight. A driver has a pattern for moving the line of sight during driving, and if the driver takes an action different from the pattern, the driver is regarded as doing that because the driver is interested in something. Using a pattern of a motion of a line of sight allows an observed object to be determined appropriately.

The size of the pupil of a driver may be detected from an image from an inside-vehicle camera, and the weighting coefficient may be set high for an object which is detected at the timing when the pupil opens wide. The human pupil is known to open when a person looks at an object of interest. Detecting the size of the pupil allows an observed object to be determined appropriately.

A relation between a detected object and a motion of a line of sight may be determined, and the weighting coefficient may be set high when the line of sight moves in the same object. If a line of sight moves in the same object, the action is regarded as being for finding out what the object is. This configuration allows an observed object to be determined appropriately.

In the above-described embodiments, an object is detected using the unit time as a measure, and an evaluation value is determined by multiplying a detected time by the weighting coefficient. Alternatively, an evaluation value may be determined using as a variable the frequency with which a detected object was seen. That is, the number of times that a driver looked aside from a detected object and again looked at the object may be counted, and the weighting coefficient may be set higher in stages as the number increases. Consequently, an object seen with an eye moving more frequently is more easily judged to be an observed object, even if the total time for which the object was seen is the same as another. Preferably, whether the weighting coefficient is raised or lowered according to the number of times for which an object was seen, and the rate of change for changing the weighting coefficient, are set as appropriate depending on a driver.

In the information provision apparatuses of the above-described embodiments, how the information output unit 41 outputs information may be changed depending on a state of a vehicle. For example, when a vehicle is traveling, information may be provided by concisely outputting information mainly by means of an audio message and so as not to disrupt driving, and when a vehicle is stopped, information may be provided in detail by means of an audio message and an image.

In the information provision apparatuses 1 to 5 of the above-described embodiments, information on an observed object is outputted only after the observed object is determined, but how information is provided is not limited to the above method. For example, a representative building and store, and other objects that can be seen from a set route may be picked out in advance; information on a picked-out object may be provided via a short message; and if the driver observes the object as a result, detailed information may be provided.

In the information provision apparatuses 2 to 5 of the above-described second to fifth embodiments, there have been described examples where the vehicle state detector 28, the route information file 29, or the like is added to the configuration of the information provision apparatus 1 of the first embodiment. However, a configuration in which the driver information DB 27 is not provided may be adopted in the second to fifth embodiments. In addition, each of the configurations for changing the setting of the weight assignment in the observed-object calculator 23, which have been described in the first to fifth embodiments, may be combined in any way.

In the above-described first embodiment, information on the number of past observations is stored in the driver information DB 27. Alternatively, a driver may be made to answer in advance a question as to the driver's preference, and information on the driver's preference obtained from the answer may be stored.

While there have been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

The invention allows an object observed by a driver to be automatically recognized based on a line of sight of the driver, and allows various services to be provided based on information on the observed object. The invention is useful as a navigation apparatus or the like to be mounted on a vehicle.

The invention claimed is:

1. An observed-object detection apparatus comprising:
a map information storage storing map information;
a vehicle position detector configured for detecting a current position and orientation of a vehicle;
a line-of-sight detector configured for detecting a line of sight of a driver;
an object detector configured for detecting a plurality of candidates of observed objects, which are on a straight line of sight detected by the line-of-sight detector, based on a current position and orientation of a vehicle detected by the vehicle position detector and on map information stored in the map information storage; and
an observed-object calculator configured for determining from the plurality of candidates of observed objects detected by the object detector an observed object observed by a driver, based on time for which the each of the plurality of candidates of observed objects is on a line of sight.

2. The observed-object detection apparatus according to claim 1, wherein the observed-object calculator assigns a weight to time for which the object is on a line of sight to determine an evaluation value, and determines as an observed object an object whose evaluation value is equal to or greater than a prescribed threshold.

3. The observed-object detection apparatus according to claim 2, comprising:
a driver information storage storing an attribute of an object observed in a past by a driver,
wherein the observed-object calculator, based on an attribute of an object stored in the driver information storage and on an attribute of a detected object, assigns a weight to time for which the object is on a line of sight to determine the evaluation value.

4. The observed-object detection apparatus according to claim 2, comprising:
a vehicle state detector configured for detecting a state of a vehicle,
wherein the observed-object calculator varies the weight based on a state of a vehicle detected by the vehicle state detector.

5. The observed-object detection apparatus according to claim 2, comprising:
a route information storage configured for storing set route information,
wherein the observed-object calculator lowers the weight to determine the evaluation value in a case where a distance to a destination, based on route information stored in the route information storage and on a current position of a vehicle, is detected to be equal to or less than a prescribed threshold, as compared to a case where a distance to a destination is greater than a prescribed threshold.

6. The observed-object detection apparatus according to claim 2, comprising:
a travel history storage storing information indicating a past travel route of a vehicle,
wherein the observed-object calculator judges whether a current position of a vehicle accords with a past travel route stored in the travel history storage or not, and varies the weight based on a result of the judgment.

7. The observed-object detection apparatus according to claim 2, comprising:
a microphone configured for collecting a sound of a conversation in a vehicle, and
a conversation analyzer configured for analyzing a conversation whose sound is collected by the microphone,
wherein the observed-object calculator determines a degree of interest in an object based on an analysis result by the conversation analyzer, and varies the weight based on the degree of interest.

8. An information provision apparatus comprising:
the observed-object detection apparatus according to any one of claims 1 to 7; and
an output unit configured for outputting information on an observed object detected by the observed-object detection apparatus.

9. A driving scene shooting apparatus comprising:
the observed-object detection apparatus according to any one of claims 1 to 7; and
an outside-vehicle camera configured for shooting an object outside a vehicle,
wherein the outside-vehicle camera shoots an observed object detected by the observed-object detection apparatus.

* * * * *